US009539941B2

(12) United States Patent
Salter et al.

(10) Patent No.: US 9,539,941 B2
(45) Date of Patent: Jan. 10, 2017

(54) PHOTOLUMINESCENT CUPHOLDER ILLUMINATION

(71) Applicant: Ford Global Technologies, LLC, Dearborn, MI (US)

(72) Inventors: Stuart C. Salter, White Lake, MI (US); Cornel Lewis Gardner, Romulus, MI (US); Chad M. Bross, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 370 days.

(21) Appl. No.: 14/326,851

(22) Filed: Jul. 9, 2014

(65) Prior Publication Data

US 2015/0138798 A1 May 21, 2015

Related U.S. Application Data

(63) Continuation-in-part of application No. 14/322,464, filed on Jul. 2, 2014, now Pat. No. 9,434,294, which is a continuation-in-part of application No. 14/301,635, filed on Jun. 11, 2014, which is a continuation-in-part of application No. 14/156,869, filed on Jan. 16, 2014, now Pat. No. 9,440,583, which is a continuation-in-part of application No. 14/086,442, filed on Nov. 21, 2013.

(51) Int. Cl.
*B60Q 1/00* (2006.01)
*B60Q 1/26* (2006.01)
*B60Q 3/02* (2006.01)
*B60Q 3/00* (2006.01)

(52) U.S. Cl.
CPC ............. *B60Q 3/0243* (2013.01); *B60Q 3/008* (2013.01)

(58) Field of Classification Search
CPC ......... B60Q 3/008; B60Q 3/02; B60Q 3/0209; B60Q 3/0243
USPC .................................. 362/487–488, 509–510
See application file for complete search history.

(56) References Cited

U.S. PATENT DOCUMENTS

| 5,709,453 | A  | 1/1998  | Krent et al. |
|-----------|----|---------|--------------|
| 6,031,511 | A  | 2/2000  | DeLuca et al. |
| 6,117,362 | A  | 9/2000  | Yen et al. |
| 6,494,490 | B1 | 12/2002 | Trantoul |
| 6,577,073 | B2 | 6/2003  | Shimizu et al. |
| 6,729,738 | B2 | 5/2004  | Fuwausa et al. |

(Continued)

FOREIGN PATENT DOCUMENTS

| CN | 201169230 Y | 12/2008 |
|----|-------------|---------|
| CN | 101337492 A | 1/2009  |

(Continued)

*Primary Examiner* — Jason Moon Han
(74) *Attorney, Agent, or Firm* — Vichit Chea; Price Heneveld LLP

(57) ABSTRACT

An apparatus for illuminating a vehicle cupholder is disclosed. The apparatus comprises a cavity formed by a console. The cavity is configured to receive a container and has a base portion. The base portion comprises a light-transmissive portion configured to transmit electromagnetic energy. A light source is configured to emit a first emission proximate the light-transmissive portion. The apparatus further comprises a photoluminescent portion proximate the light-transmissive portion. The photoluminescent portion is configured to be excited in response to the first emission to generate a second emission configured to illuminate the cavity.

16 Claims, 4 Drawing Sheets

(56) References Cited

U.S. PATENT DOCUMENTS

| | | | |
|---|---|---|---|
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,952,107 B2 | 5/2011 | Daniels et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,162,520 B2 * | 4/2012 | Penner | B60N 3/101 362/154 |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 * | 6/2014 | Marx | F21K 9/00 257/88 |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson |
| 2006/0097121 A1* | 5/2006 | Fugate | A47G 23/0309 248/311.2 |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0075842 A1* | 3/2012 | Goto | B60N 3/101 362/154 |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| CN | 101737646 A | 6/2010 |
| CN | 202812946 U | 3/2013 |
| CN | 202839740 U | 3/2013 |
| CN | 203367350 U | 12/2013 |
| CN | 103545429 A | 1/2014 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

PHOTOLUMINESCENT CUPHOLDER ILLUMINATION

CROSS-REFERENCE TO RELATED APPLICATIONS

This application is a continuation-in-part of U.S. patent application Ser. No. 14/322,464, filed Jul. 2, 2014, and entitled "PHOTOLUMINESCENT VEHICLE BADGE," which is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems, and more particularly, to a container holder employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an apparatus for illuminating a vehicle cupholder is disclosed. The apparatus comprises a cavity formed by a console. The cavity is configured to receive a container and has a base portion. The base portion comprises a light-transmissive portion configured to transmit electromagnetic energy. A light source is configured to emit a first emission proximate the light-transmissive portion. The apparatus further comprises a photoluminescent portion proximate the light-transmissive portion. The photoluminescent portion is configured to be excited in response to the first emission to generate a second emission configured to illuminate the cavity.

According to another aspect of the present invention, a console configured to illuminate a vehicle container holder is disclosed. The console comprises a semi-cylindrical cavity configured to receive a container formed by a sidewall of the console. A base portion abuts the sidewall and is configured to emit a first emission. A feature is located proximate the sidewall. The first emission is transmitted through the base portion and configured to excite the feature to emit a second emission.

According to yet another aspect of the present invention, a vehicle console assembly configured to hold beverage containers is disclosed. The console assembly comprises a first cavity having a first base portion, a second cavity having a second base portion, and a light source configured to emit a first emission proximate the first and second base portions. The first and second base portions comprise a photoluminescent material configured to convert the first emission to a second emission in response to an excitation of the photoluminescent material.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an apparatus configured to illuminate a container holder of a vehicle. The apparatus may include a light source operable to output a first emission comprising a first wavelength of light. At least one portion of the container holder may include a photoluminescent material configured to convert the first emission to a second emission. The second emission may have a second wavelength longer wavelength than the first wavelength. Upon receipt of the first emission, the photoluminescent material may emit the light at the second wavelength to illuminate the container holder.

Figure 1:
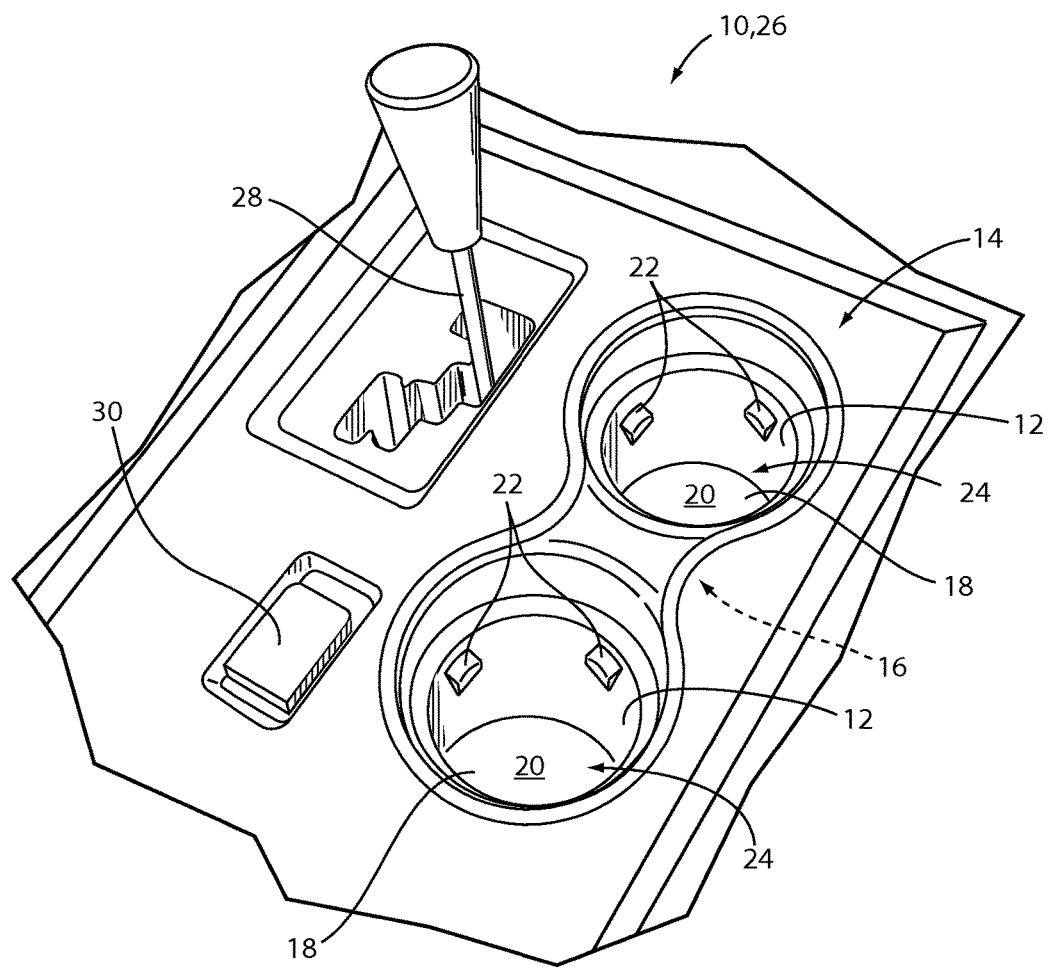
FIG. 1 is a perspective view of a vehicle console comprising a container holder.

Referring to FIG. 1, a perspective view of a vehicle console 10 comprising a container holder 12 is shown in accordance with one embodiment of the disclosure. The container holder 12 may comprise a cupholder, beverage container, or any device configured to retain a position of an object within a vehicle. The vehicle console 10 may be incorporated in any portion of a passenger compartment of a vehicle, for example a center console, organizer, door panel, etc. The container holder 12 may comprise a lighting apparatus 14 comprising a light source 16 configured to excite a photoluminescent material disposed in at least one photoluminescent portion 18.

The container holder 12 is configured to provide a soft ambient lighting emitted from the at least one photoluminescent portion 18 of the container holder 12. In order to incorporate the soft ambient lighting in the container holder 12, the at least one photoluminescent portion 18 may be configured to emit light from various portions of the container holder 12. The at least one photoluminescent portion 18 may comprise a base portion 20, and in some implementations may further comprise at least one finger 22. The at least one finger 22 may extend outward into a container receiving cavity 24 formed by the container holder 12 and may be configured to secure a container disposed in the receiving cavity 24.

The light source 16 may be disposed beneath the base portion 20 and is configured to emit a first emission. The first emission comprises electromagnetic radiation in the form of light that is configured to excite the at least one photoluminescent portion 18. The first emission may comprise a first wavelength of light corresponding to a blue and/or near ultraviolet wavelength of light. In response receiving the first emission, the at least one photoluminescent portion 18 may become excited and emit a second emission comprising at least a second wavelength of light longer than the first wavelength. The second wavelength of light may provide for the second emission to be substantially more perceptible to the human eye relative to the first wavelength. In this way, the lighting apparatus 14 provides an ambient glowing light in the form of the second emission emitted from the at least one photoluminescent portion 18.

In the example illustrated in FIG. 1, the container holder 12 is demonstrated as a component of a center vehicle console 26. For purposes of illustration, the center counsel 26 further comprises a gearshift lever 28 and an actuator 30. Though demonstrated in a particular configuration, the container holder 12 may be configured for use in any portion of a vehicle. The container holder 12 may also be configured for use in various forms of vehicles including automotive vehicles, watercraft, airplanes, trains, buses, etc. to provide a cost-effective system to illuminate the container holder 12.

Figure 2A:
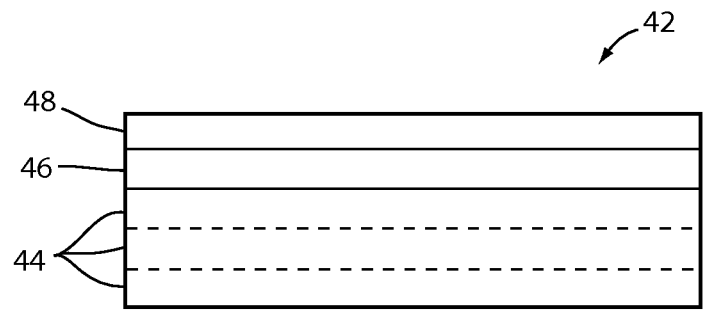
FIG. 2A illustrates a photoluminescent structure rendered as a coating.
Figure 2B:
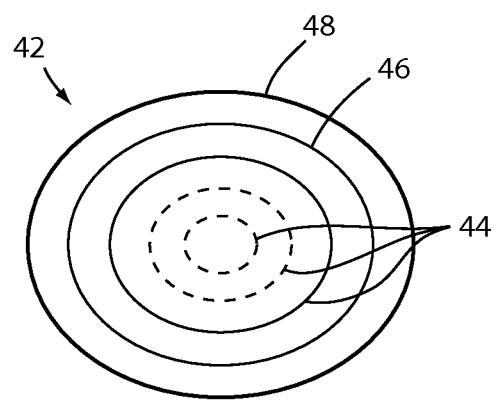
FIG. 2B illustrates the photoluminescent structure rendered as a discrete particle.
Figure 2C:
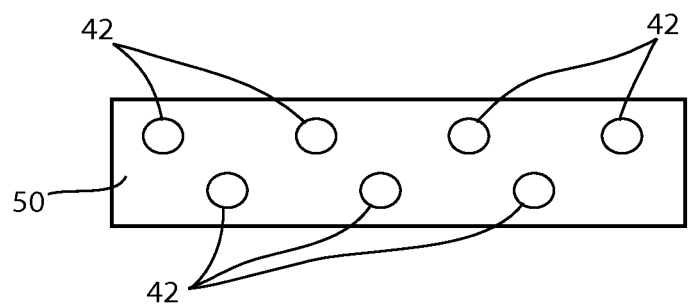
FIG. 2C illustrates a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 42 may correspond to the at least one photoluminescent portion 18 as discussed herein. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) corresponds to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle fixture. The energy conversion layer 44 coating may be deposited on a vehicle fixture by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a vehicle fixture or panel. When the energy conversion layer 44 includes a multilayer formulation, each layer may be sequentially coated. Additionally the layers can be separately prepared and later laminated or embossed together to form an integral layer. The layers may also be coextruded to prepare an integrated multi-layered energy conversion structure. For clarity, the polymer matrix 50 comprising photoluminescent material may be referred to as the energy conversion layer 44 hereinafter to demonstrate that each may be similarly utilized to convert the first wavelength of light to at least a second wavelength.

Referring back to FIGS. 2A and 2B, the photoluminescent structure 42 may optionally include at least one stability layer 46 to protect the photoluminescent material contained within the energy conversion layer 44 from photolytic and thermal degradation to provide sustained emissions of outputted electromagnetic radiation. The stability layer 46 may be configured as a separate layer optically coupled and adhered to the energy conversion layer 44. The stability layer 46 may also be integrated with the energy conversion layer 44. The photoluminescent structure 42 may also optionally include a protective layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture.

In some implementations, the photoluminescent structure 42 may be incorporated into a vehicle fixture as one or more discrete multilayered particles as shown in FIG. 2C. The photoluminescent structure 42 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Figure 3:
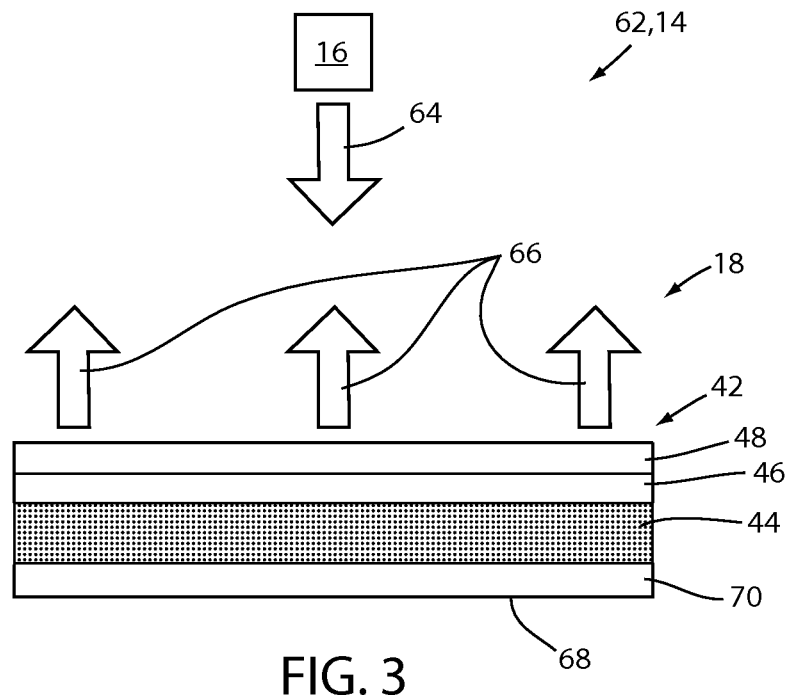
FIG. 3 is schematic view of a front-lit configuration of a lighting apparatus for a container holder configured to convert a first wavelength of light to at least a second wavelength.

Referring to FIG. 3, the lighting apparatus 14 is generally shown according to a front-lit configuration 62. In this configuration, the light or a first emission 64 emitted from the light source 16 is converted to a second emission 66 by the energy conversion layer 44. The first emission 64 comprises a first wavelength $\lambda_1$, and the second emission 66 comprises a second wavelength $\lambda_2$. The lighting apparatus 14 comprises the photoluminescent structure 42 disposed on or in at least one photoluminescent portion. The photoluminescent structure 42 may be rendered as a coating and applied to a substrate 68 of a vehicle fixture 70, for example the at least one finger 22. The photoluminescent material may also be dispersed as a polymer matrix 50 corresponding to the energy conversion layer 44. In some implementations, the energy conversion layer 44 may further include the stability layer 46 and/or protective layer 48. In response to the light source 16 being activated, the first emission 64 is received by the energy conversion layer 44 and converted from the first emission 64 having the first wavelength $\lambda_1$ to the second emission 66 having at least the second wavelength $\lambda_2$. The second emission 66 may comprise a plurality of wavelengths $\lambda_2$, $\lambda_3$, $\lambda_4$ configured to emit any color of light from the photoluminescent portion 18.

In various implementations, the lighting apparatus 14 comprises at least one photoluminescent material incorporated in the polymer matrix 50 and/or energy conversion layer 44 and is configured to convert the first emission 64 at the first wavelength $\lambda_1$ to the second emission 66 having at least the second wavelength $\lambda_2$. In order to generate the plurality of wavelengths $\lambda_2$, $\lambda_3$, $\lambda_4$, the energy conversion layer 44 may comprise a red-emitting photoluminescent material, a green-emitting photoluminescent material, and a blue-emitting photoluminescent material dispersed in the polymer matrix 50. The red, green, and blue-emitting photoluminescent materials may be combined to generate a wide variety of colors of light for the second emission 66. For example, the red, green, and blue-emitting photoluminescent materials may be utilized in a variety of proportions and combinations to control the output color of the second emission 66.

Each of the photoluminescent materials may vary in output intensity, output wavelength, and peak absorption wavelengths based on a particular photochemical structure and combinations of photochemical structures utilized in the energy conversion layer 44. As an example, the second emission 66 may be changed by adjusting the wavelength of the first emission $\lambda_1$ to activate the photoluminescent materials at different intensities to alter the color of the second emission 66. In addition to, or alternatively to the red, green, and blue-emitting photoluminescent materials, other photoluminescent materials may be utilized alone and in various combinations to generate the second emission 66 in a wide variety of colors. In this way, the lighting apparatus 14 may be configured for a variety of applications to provide a desired lighting color and effect for a vehicle.

The light source 16 may also be referred to as an excitation source and is operable to emit at least the first emission 64. The light source 16 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 64. The first emission 64 from the light source 16 may be configured such that the first wavelength $\lambda_1$ corresponds to at least one absorption wavelength of the one or more photoluminescent materials of the energy conversion layer 44 and/or polymer matrix 50. In response to receiving the light at the first wavelength $\lambda_1$, the energy conversion layer 44 may be excited and output the one or more output wavelengths $\lambda_2$, $\lambda_3$, $\lambda_4$. The first emission 64 provides an excitation source for the energy conversion layer 44 by targeting absorption wavelengths of the various photoluminescent materials utilized therein. As such, the lighting apparatus 14 may configured to output the second emission 66 to generate a desired light intensity and color.

In an exemplary implementation, the light source 16 comprises an LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may also comprise wavelengths in a near ultraviolet color range (~390-450 nm). In an exemplary implementation, $\lambda_1$ may be approximately equal to 470 nm.

The blue spectral color range and shorter wavelengths may be utilized as an excitation source for the lighting apparatus 14 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting apparatus 14 creates a visual effect of light originating from the photoluminescent structure 42. In this configuration, light is emitted from the photoluminescent structure 42 (e.g. the first photoluminescent portion 18) from locations of the vehicle 10 that may be inaccessible or costly to add conventional light sources requiring electrical connections.

As discussed herein, each of the plurality of wavelengths $\lambda_2$, $\lambda_3$, $\lambda_4$ may correspond to a significantly different spectral color range. The second wavelength $\lambda_2$ may correspond to the excitation of a red-emitting photoluminescent material having a wavelength of approximately 620-750 nm. The third wavelength $\lambda_3$ may correspond to the excitation of a green emitting photoluminescent material having a wavelength of approximately 526-606 nm. The fourth wavelength $\lambda_4$ may correspond to a blue or blue green emitting photoluminescent material having a wavelength longer than the first wavelength $\lambda_1$ and approximately 430-525 nm. The wavelengths $\lambda_2$, $\lambda_3$, $\lambda_4$ may be utilized to generate a wide variety of colors of light from the at least one photoluminescent portion 18 converted from the first wavelength $\lambda_1$.

Figure 4:
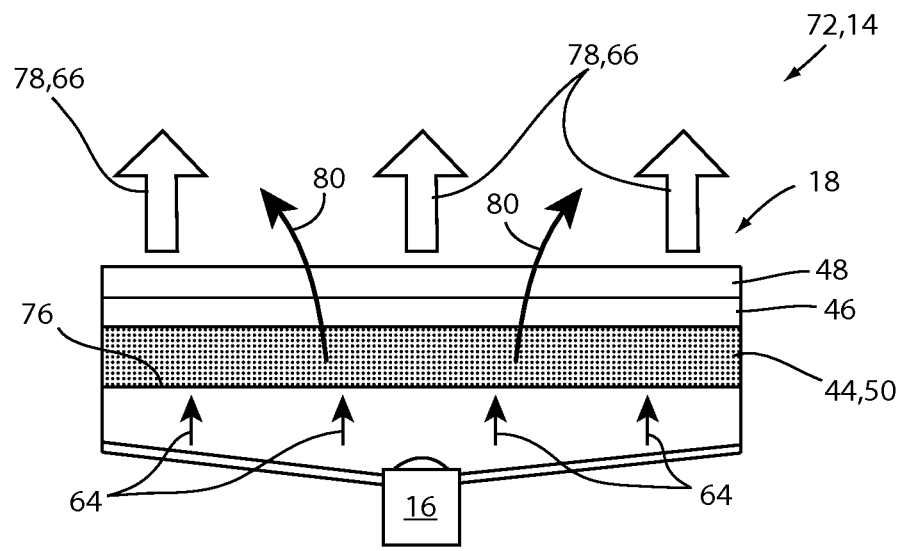
FIG. 4 is schematic view of a back-lit configuration of a lighting apparatus for a container holder configured to convert a first wavelength of light to at least a second wavelength.

Referring to FIG. 4, the lighting apparatus 14 is generally shown according to a back-lit configuration 72 to convert the first emission 64 from the light source 16 to the second emission 66. In this configuration, the lighting apparatus 14 may comprise an optic device 74 configured to channel the light at the first wavelength $\lambda_1$ substantially along the photoluminescent portion 18. The optic device 74 may be of any material configured to transmit the light at the first wavelength $\lambda_1$ substantially across the extents of a surface 76 of the optic device 74. In some implementations, the optic device 74 may comprise a polymeric material configured to provide a refractive index such that the light at the first wavelength is transmitted consistently throughout the surface 76.

The backlit configuration also comprises an energy conversion layer 44 and/or photoluminescent material dispersed in a polymer matrix 50. Similar to the energy conversion layer 44 demonstrated in reference to the front-lit configuration 62, the energy conversion layer 44 may be configured to be excited and output the one or more output wavelengths $\lambda_2, \lambda_3, \lambda_4$ in response to receiving the first emission 64. The one or more output wavelengths $\lambda_2, \lambda_3, \lambda_4$ correspond to the second emission 66. The plurality of wavelengths $\lambda_2, \lambda_3, \lambda_4$ of the second emission 66 may be configured to emit any color of light from the photoluminescent portion 18 in response to the excitation of the energy conversion layer 44. The color of the light corresponding to the second emission 66 may be controlled by utilizing a ratio of photoluminescent materials as discussed herein.

In the backlit configuration 72, the photoluminescent portion 18 may be at least partially light-transmissive and configured to transmit electromagnetic radiation from the light source 16 outward from the lighting apparatus 14. In such a configuration, a concentration of the photoluminescent material in the energy conversion layer 44 may be configured to convert a first portion 78 of the first emission 64 to the second emission 66 while allowing a second portion 80 of the first emission 64 to pass through the photoluminescent portion 18 and remain at the first wavelength $\lambda_1$. As illustrated in FIG. 4, the first portion 78 of the first emission 64 is converted to the second emission 66, while the second portion 80 passes through the energy conversion layer and remains at the first wavelength $\lambda_1$. The second portion 80 of the first emission 64 may be directed to additional photoluminescent portions and converted to a third emission. For example, the second portion 80 may be directed to a photoluminescent portion of the at least one finger 22 as discussed in reference to FIG. 5.

Figure 5:
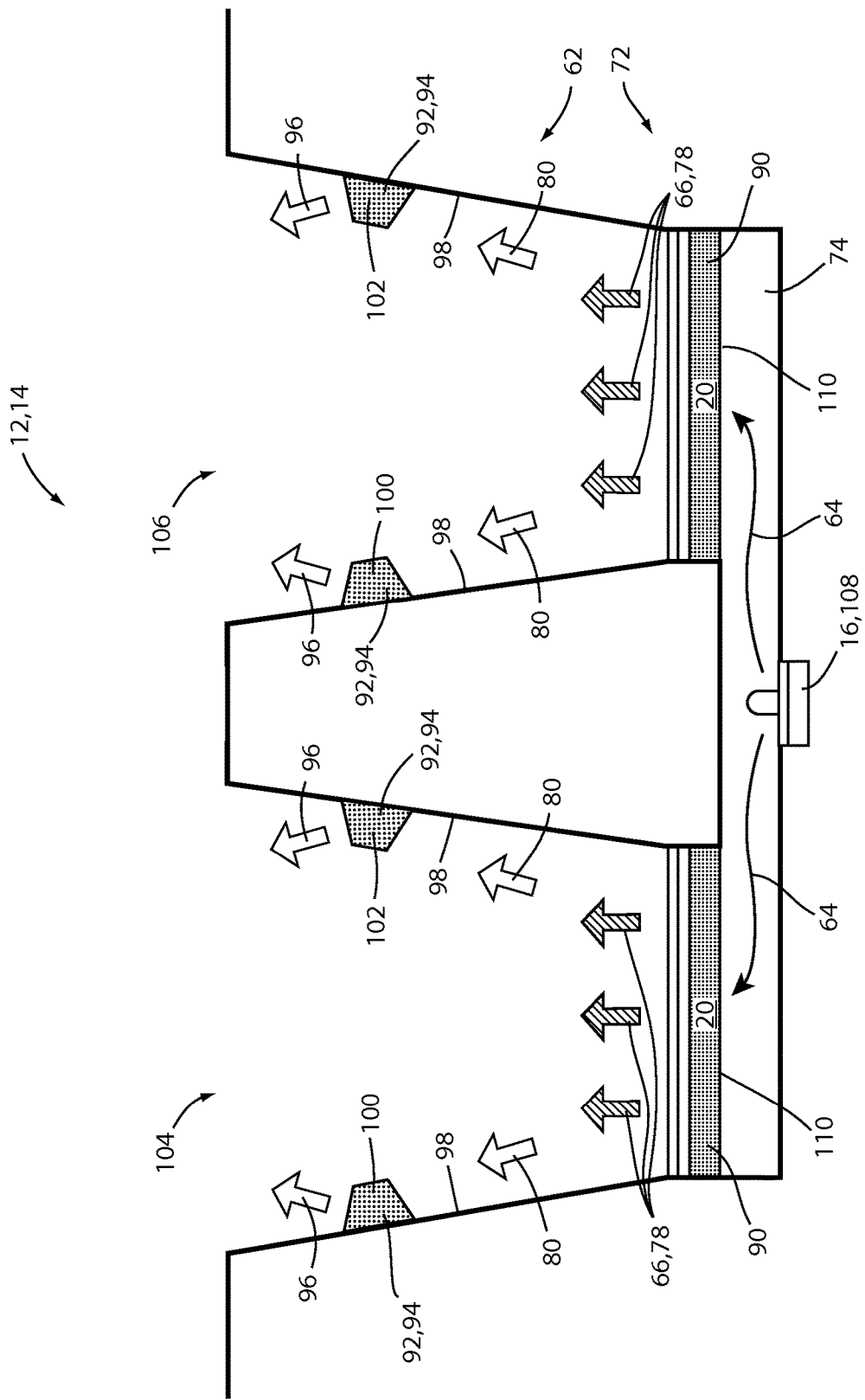
FIG. 5 is schematic view of a lighting apparatus for a container holder configured to convert a first wavelength of light to at least a second wavelength.

Referring to FIG. 5 a schematic view of the lighting apparatus 14 for the container holder 12 is shown. In this exemplary implementation, the light source 16 is configured to generate light to illuminate the container holder 12 in both a front-lit configuration 62 and a back-lit configuration 72. In this implementation, a first photoluminescent portion 90 may correspond to the back-lit configuration 72, and a second photoluminescent 92 portion may correspond to the front-lit configuration 62. By illuminating both the first photoluminescent portion 90 and the second photoluminescent portion 92, the lighting apparatus 14 provides for an efficient lighting system operable to illuminate multiple portions of the container holder from a single, conveniently located light source.

The first photoluminescent portion 90 may comprise the base portion 20. The base portion 20 may comprise any material operable to transmit a portion of the first emission 64 at the first wavelength $\lambda_1$ through the base portion and into the container receiving cavity 24. The base portion may comprise any material or polymer matrix comprising a concentration of photoluminescent material configured to convert the first portion 78 of the first emission 64 to the second emission 66 and allow the second portion 80 of the first emission 64 to pass therethrough. In some implementations, the base portion 20 may comprise a semi-transparent polymer mat having the photoluminescent structure 42 molded therein.

The second photoluminescent portion 92 may comprise the at least one finger 22 or as demonstrated in FIG. 5, a plurality of fingers 94 configured to secure a container disposed in the receiving cavity 24. In some implementations, the second photoluminescent portion 92 may comprise the energy conversion layer 44 applied as a coating and may also comprise at least one photoluminescent structure disposed in a polymer matrix used to form or coat the plurality of fingers 94. The second photoluminescent portion 92 may be configured to convert the first emission 64 at the first wavelength $\lambda_1$ to at least a second wavelength $\lambda_2$ longer than the first wavelength $\lambda_1$.

In some implementations, the second photoluminescent portion 92 may be configured to emit a third emission 96. The third emission 96 may be configured to emit light having a substantially similar color to the second emission 66 and may also comprise a corresponding photoluminescent materials and proportions similar to the first photoluminescent portion 90. In some implementations, the second photoluminescent portion may be configured to emit the third emission 96 having a different color than the second emission 66. As discussed in reference to the at least one photoluminescent portion 18, the first and second photoluminescent portions 90, 92 may be configured to emit the second emission 66 having a first color and third emission 96 having a second color different from the first color. The color of the second emission 66 and the third emission 96 may be manipulated by utilizing photoluminescent materials in a variety of proportions and combinations to control the output colors and corresponding wavelengths of light to illuminate the container holder 12.

Though the second photoluminescent portion 92 is described in detail in reference to the plurality of fingers 94, the second photoluminescent portion 92 may correspond to any feature disposed in or proximate to the container holder 12. For example, the second photoluminescent portion may comprise a ring configured illuminate in response to the first emission 64 disposed on a sidewall 98 of the container holder 12, a pivoting arm configured to secure a container, or any other feature. Further, each of the features may be configured to emit light in different colors. For example, the base portion may be configured to emit the second emission 66 having a green colored light, a first finger 100 of the plurality of fingers 94 may be configured to emit a third emission having a yellow colored light, and a second finger 102 of the plurality of fingers 94 may be configured to emit a fourth emission having a white colored light. In this way, the lighting apparatus 14 may be utilized to produce any combination of colors for a variety of ambient lighting effects.

In an exemplary implementation as demonstrated in FIG. 5, the lighting apparatus 14 may be configured to provide ambient lighting in the container holder 12 as disclosed. In various implementations, the container holder 12 may be configured to receive a plurality of containers in a plurality of container receiving cavities including a first receiving cavity 104 and a second receiving cavity 106. In this configuration, the lighting apparatus 14 is configured to illuminate the first receiving cavity 104 and the second receiving cavity 106 from a centralized light source 108. In this way, the disclosure may provide for further efficiency by illuminating the plurality of container receiving cavities from the centralized light source 108.

In operation, the light source 16 (e.g. the centralized light source 108) is configured to emit the first emission 64 into the optic device 74. The optic device 74 is configured to disperse the first emission 64 consistently along a surface 110 of the first photoluminescent portion 90 of each of the container receiving cavities 104, 106. Upon receipt of the first emission, the first photoluminescent portion 90 is configured to convert the first portion 78 of the first emission to the second emission 66 to illuminate the base portion 20. The concentration of the photoluminescent materials in the first photoluminescent portion 90 is configured to allow the second portion 80 of the first emission to pass through the base portion 20 and pass into the container receiving cavities 104, 106 to illuminate at least one feature comprising the second photoluminescent portion 92.

In some implementations, the second portion 80 of the first emission 64 may pass through each of the container receiving cavities 104, 106 to the plurality of fingers 94. The plurality of fingers 94 may comprise the second photoluminescent portion 92. Upon receipt of the second portion 80 of the first emission 64, the second photoluminescent portion 92 may become excited and illuminate each of the fingers 94. In this configuration, the lighting apparatus 14 is operable to provide ambient lighting for the container holder 12 from a cost effective, centrally located light source. Further, the lighting apparatus 14 is configured to illuminate the container holder 12 in a wide variety of colors and combinations to provide lighting that may be customized based on any preference. The various implementations of the systems and methods disclosed herein provide a novel approach for illuminating a container holder for a vehicle and may be utilized to provide attractive ambient lighting in a variety of settings.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An apparatus for illuminating a vehicle cupholder comprising:
    a cavity formed by a console having a base portion configured to receive a container, the base portion comprising a light-transmissive portion configured to transmit electromagnetic energy;
    a light source configured to emit a first emission proximate the light-transmissive portion;
    a photoluminescent portion proximate the light-transmissive portion, configured to be excited in response to the first emission, the excitation generating a second emission configured to illuminate the cavity; and
    a feature disposed on a wall of the cavity, the feature comprising a second photoluminescent portion excited in response to the first emission transmitted through the light-transmissive portion.

2. The apparatus according to claim 1, wherein the first emission comprises a shorter wavelength than the second emission.

3. The apparatus according to claim 1, wherein the second emission comprises a plurality of wavelengths configured to generate a substantially white light.

4. The apparatus according to claim 1, wherein the photoluminescent portion is disposed on the light-transmissive portion.

5. The apparatus according to claim 1, wherein the base portion comprises a polymer mat having the photoluminescent portion molded therein.

6. The apparatus according to claim 1, wherein the photoluminescent portion is configured to convert a first portion of the first emission from a first wavelength to a second wavelength such that a second portion of the first emission at the first wavelength is operable to excite the feature.

7. A console configured to illuminate a vehicle container holder comprising:
    a semi-cylindrical cavity configured to receive a container formed by a sidewall of the console;
    a base portion abutting the sidewall and configured to transmit light energy;
    a light source disposed proximate the base portion configured to emit a first emission;
    a feature located proximate the sidewall, wherein the first emission is transmitted through the base portion and configured to excite the feature to emit a second emission, wherein the base portion comprises a photoluminescent portion configured to convert a first portion of the first emission to a third emission and transmit a second portion of the first emission to the feature.

8. The console according to claim 7, wherein the first emission comprises a shorter wavelength than the second emission.

9. The console according to claim 7, wherein the feature comprises a photoluminescent portion configured to emit the second emission in response to the excitation from the first emission.

10. The console according to claim 7, wherein the first emission is emitted from the base portion through at least a portion of the semi-cylindrical cavity.

11. The console according to claim 7, wherein the feature comprises a ring disposed radially along the sidewall to illuminate the container holder.

12. The console according to claim 7, wherein the feature comprises a raised portion extending into the semi-cylindrical cavity from the sidewall configured to secure a container in the container holder.

13. The console according to claim 7, wherein the first emission comprises a shorter wavelength than the third emission.

14. A vehicle console assembly configured to hold beverage containers comprising:
    a first cavity having a first base portion and configured to hold a beverage;
    a second cavity having a second base portion and configured to hold a beverage;
    a light source configured to emit a first emission proximate the first and second base portions, wherein the first and second base portions comprise a photoluminescent material configured to convert the first emission to a second emission in response to an excitation of the photoluminescent material, wherein the first and second base portions are configured to transmit a portion of the first emission to a feature located in at least one of the first cavity and the second cavity, the feature comprising a second photoluminescent material configured to emit a third emission in response to receiving the portion of the first emission.

15. The console assembly according to claim 14, further comprising:
an optic device configured to receive the first emission and substantially spread the first emission about a surface of each of the first base portion and the second base portion.

16. The console assembly according to claim 14, wherein the light source comprises an LED configured to emit the first emission at a first wavelength and the second emission is converted by the photoluminescent material to a second wavelength longer than the first wavelength.

* * * * *